(12) United States Patent
Dawson et al.

(10) Patent No.: US 8,249,984 B2
(45) Date of Patent: Aug. 21, 2012

(54) SYSTEM AND METHOD FOR FAIR-SHARING IN BANDWIDTH SHARING AD-HOC NETWORKS

(75) Inventors: Christopher J. Dawson, Arlington, VA (US); Peter G. Finn, Brampton (CA); Rick A. Hamilton, II, Charlottesville, VA (US); Jenny S. Li, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 938 days.

(21) Appl. No.: 11/755,806

(22) Filed: May 31, 2007

(65) Prior Publication Data

US 2008/0301039 A1    Dec. 4, 2008

(51) Int. Cl.
*G06Q 40/00* (2006.01)

(52) U.S. Cl. ............ 705/39; 705/14; 705/14.27; 705/38; 705/30; 370/230; 348/581

(58) Field of Classification Search .................... 705/38, 705/39, 14, 30, 14.27; 370/230; 348/581
See application file for complete search history.

(56) References Cited

U.S. PATENT DOCUMENTS

| | | | |
|---|---|---|---|
| 5,390,113 A * | 2/1995 | Sampson ........................ 705/30 |
| 5,437,054 A | 7/1995 | Rappaport et al. |
| 5,490,201 A | 2/1996 | Moberg et al. |
| 5,953,338 A | 9/1999 | Ma et al. |
| 5,959,975 A | 9/1999 | Sofman et al. |
| 6,006,084 A | 12/1999 | Miller et al. |
| 6,035,281 A | 3/2000 | Crosskey et al. |
| 6,047,268 A | 4/2000 | Bartoli et al. |
| 6,366,907 B1 | 4/2002 | Fanning et al. |
| 6,396,805 B2 | 5/2002 | Romrell |
| 6,397,061 B1 | 5/2002 | Jordan et al. |
| 6,477,522 B1 | 11/2002 | Young |
| 6,522,735 B1 | 2/2003 | Fortman et al. |
| 6,653,933 B2 | 11/2003 | Raschke et al. |
| 6,751,196 B1 | 6/2004 | Hulyalkar et al. |
| 6,763,248 B1 | 7/2004 | Odamura |
| 6,810,428 B1 | 10/2004 | Larsen et al. |
| 6,850,764 B1 | 2/2005 | Patel |
| 6,879,574 B2 | 4/2005 | Naghian et al. |
| 6,941,378 B2 | 9/2005 | Apostolopoulos et al. |
| 6,954,616 B2 | 10/2005 | Liang et al. |
| 6,954,790 B2 | 10/2005 | Forslöw |

(Continued)

FOREIGN PATENT DOCUMENTS

EP    0999662    5/2005

(Continued)

OTHER PUBLICATIONS

D. Zhu et al., "QoS Aware Wireless Bandwith Aggregation (QAWBA) by Integrating Cellular and Ad-hoc Networks."

(Continued)

*Primary Examiner* — Harish T Dass
(74) *Attorney, Agent, or Firm* — William Schiesser; Roberts Mlotkowski Safran & Cole, P.C.

(57) ABSTRACT

Systems and methods for fair-sharing in bandwidth sharing ad-hoc networks. A method includes maintaining a borrower account and lender account of a borrower and a lender of an ad hoc network. The method also includes adjusting at least one of the borrower account and the lender account based upon data transfer by the lender for the borrower.

9 Claims, 12 Drawing Sheets

U.S. PATENT DOCUMENTS

| | | | |
|---|---|---|---|
| 6,961,575 B2 | 11/2005 | Stanforth | |
| 6,975,613 B1 | 12/2005 | Johansson | |
| 6,980,511 B1 * | 12/2005 | Li et al. | 370/230 |
| 6,990,113 B1 | 1/2006 | Wang et al. | |
| 7,016,375 B1 | 3/2006 | Rosenberg et al. | |
| 7,028,096 B1 | 4/2006 | Lee | |
| 7,043,225 B1 | 5/2006 | Patel et al. | |
| 7,058,014 B2 | 6/2006 | Sim | |
| 7,058,387 B2 | 6/2006 | Kumar et al. | |
| 7,065,367 B2 | 6/2006 | Michaelis et al. | |
| 7,075,890 B2 | 7/2006 | Ozer et al. | |
| 7,085,281 B2 | 8/2006 | Thomas et al. | |
| 7,089,301 B1 | 8/2006 | Labio et al. | |
| 7,130,283 B2 | 10/2006 | Vogel et al. | |
| 7,174,385 B2 | 2/2007 | Li | |
| 7,224,964 B2 | 5/2007 | Souissi et al. | |
| 7,240,015 B1 | 7/2007 | Karmouch et al. | |
| 7,257,632 B2 | 8/2007 | Zhang et al. | |
| 7,274,658 B2 | 9/2007 | Bornstein et al. | |
| 7,310,641 B2 | 12/2007 | Moore et al. | |
| 7,340,759 B1 | 3/2008 | Rodriguez | |
| 7,376,747 B2 | 5/2008 | Hartop | |
| 7,401,153 B2 | 7/2008 | Traversat et al. | |
| 7,440,573 B2 | 10/2008 | Lor et al. | |
| 7,447,656 B2 * | 11/2008 | Parthasarathy | 705/38 |
| 7,450,517 B2 | 11/2008 | Cho | |
| 7,450,949 B2 | 11/2008 | Choksi | |
| 7,460,549 B1 | 12/2008 | Cardei et al. | |
| 7,463,890 B2 | 12/2008 | Herz | |
| 7,489,656 B2 | 2/2009 | Guo et al. | |
| 7,530,102 B2 | 5/2009 | Moskowitz | |
| 7,546,342 B2 | 6/2009 | Li et al. | |
| 7,593,333 B2 | 9/2009 | Li et al. | |
| 7,609,748 B2 | 10/2009 | Karlsson | |
| 7,623,524 B2 | 11/2009 | Muthukrishnan et al. | |
| 7,633,908 B1 | 12/2009 | Kwong et al. | |
| 7,788,133 B2 | 8/2010 | Delenda | |
| 7,830,834 B2 | 11/2010 | Das et al. | |
| 2001/0027484 A1 | 10/2001 | Nishi | |
| 2001/0029182 A1 | 10/2001 | McCann et al. | |
| 2002/0013767 A1 * | 1/2002 | Katz | 705/39 |
| 2002/0029274 A1 | 3/2002 | Allen | |
| 2002/0053033 A1 | 5/2002 | Cooper et al. | |
| 2002/0053082 A1 | 5/2002 | Weaver et al. | |
| 2002/0058499 A1 | 5/2002 | Ortiz | |
| 2002/0061009 A1 | 5/2002 | Sorensen | |
| 2002/0069278 A1 | 6/2002 | Forslow | |
| 2002/0071477 A1 | 6/2002 | Orava | |
| 2002/0075940 A1 | 6/2002 | Haartsen | |
| 2002/0102987 A1 | 8/2002 | Souisse et al. | |
| 2002/0110110 A1 | 8/2002 | Tiihonen et al. | |
| 2002/0120873 A1 | 8/2002 | Salmivalli | |
| 2002/0122410 A1 | 9/2002 | Kulikov et al. | |
| 2002/0141358 A1 | 10/2002 | Requena | |
| 2002/0145978 A1 | 10/2002 | Batsell et al. | |
| 2002/0173272 A1 | 11/2002 | Liang et al. | |
| 2003/0032433 A1 | 2/2003 | Daniel et al. | |
| 2003/0037033 A1 | 2/2003 | Nyman et al. | |
| 2003/0053493 A1 | 3/2003 | Graham Mobley et al. | |
| 2003/0068975 A1 | 4/2003 | Qiao et al. | |
| 2003/0117978 A1 | 6/2003 | Haddad | |
| 2003/0120594 A1 | 6/2003 | Shaginaw et al. | |
| 2003/0137976 A1 | 7/2003 | Zhu et al. | |
| 2003/0139180 A1 | 7/2003 | McIntosh et al. | |
| 2003/0153338 A1 | 8/2003 | Herz et al. | |
| 2003/0235174 A1 | 12/2003 | Pichna et al. | |
| 2003/0235175 A1 | 12/2003 | Naghian et al. | |
| 2004/0006621 A1 | 1/2004 | Bellinson et al. | |
| 2004/0022224 A1 | 2/2004 | Billhartz | |
| 2004/0029553 A1 | 2/2004 | Cain | |
| 2004/0064351 A1 * | 4/2004 | Mikurak | 705/7 |
| 2004/0078323 A1 | 4/2004 | Johnston et al. | |
| 2004/0100929 A1 | 5/2004 | Garcia-Luna-Aceves | |
| 2004/0128231 A1 | 7/2004 | Morita | |
| 2004/0156312 A1 | 8/2004 | Salonidis et al. | |
| 2004/0162871 A1 | 8/2004 | Pabla et al. | |
| 2004/0165548 A1 | 8/2004 | Backes | |
| 2004/0185777 A1 | 9/2004 | Bryson | |
| 2004/0192204 A1 | 9/2004 | Periyalwar et al. | |
| 2004/0203820 A1 | 10/2004 | Billhartz | |
| 2004/0260808 A1 | 12/2004 | Strutt | |
| 2004/0264466 A1 | 12/2004 | Huang | |
| 2005/0063419 A1 | 3/2005 | Schrader et al. | |
| 2005/0080872 A1 | 4/2005 | Davis et al. | |
| 2005/0111418 A1 | 5/2005 | Yang et al. | |
| 2005/0153725 A1 | 7/2005 | Naghian et al. | |
| 2005/0157661 A1 | 7/2005 | Cho | |
| 2005/0169209 A1 | 8/2005 | Miu et al. | |
| 2005/0169257 A1 | 8/2005 | Lahetkangas et al. | |
| 2005/0193221 A1 | 9/2005 | Yoneyama | |
| 2005/0203834 A1 | 9/2005 | Prieston | |
| 2005/0213503 A1 | 9/2005 | Guo et al. | |
| 2006/0002326 A1 | 1/2006 | Vesuna | |
| 2006/0034330 A1 | 2/2006 | Iwamura | |
| 2006/0085543 A1 | 4/2006 | Hrastar et al. | |
| 2006/0095582 A1 | 5/2006 | Nitya et al. | |
| 2006/0109787 A1 | 5/2006 | Strutt et al. | |
| 2006/0114853 A1 | 6/2006 | Hasty et al. | |
| 2006/0126504 A1 | 6/2006 | Meier et al. | |
| 2006/0167784 A1 | 7/2006 | Hoffberg | |
| 2006/0176829 A1 | 8/2006 | McLaughlin et al. | |
| 2006/0179143 A1 | 8/2006 | Walker et al. | |
| 2006/0187858 A1 | 8/2006 | Kenichi et al. | |
| 2006/0193295 A1 | 8/2006 | White et al. | |
| 2006/0205408 A1 | 9/2006 | Nakagawa et al. | |
| 2006/0224502 A1 * | 10/2006 | McGowan | 705/38 |
| 2006/0233377 A1 | 10/2006 | Chang et al. | |
| 2006/0274214 A1 | 12/2006 | Carro | |
| 2006/0294258 A1 | 12/2006 | Powers-Boyle et al. | |
| 2007/0005797 A1 | 1/2007 | Fontijn et al. | |
| 2007/0019771 A1 | 1/2007 | Ambuehl et al. | |
| 2007/0117537 A1 | 5/2007 | Hui et al. | |
| 2007/0124204 A1 * | 5/2007 | de Boer et al. | 705/14 |
| 2007/0140272 A1 | 6/2007 | Gulliksson | |
| 2007/0206528 A1 | 9/2007 | Walton et al. | |
| 2007/0258359 A1 | 11/2007 | Ogasawara et al. | |
| 2007/0298764 A1 | 12/2007 | Clayton | |
| 2008/0008140 A1 | 1/2008 | Forssell | |
| 2008/0040481 A1 | 2/2008 | Joshi et al. | |
| 2008/0104202 A1 | 5/2008 | Barrett et al. | |
| 2008/0167982 A1 | 7/2008 | Leo et al. | |
| 2008/0204448 A1 | 8/2008 | Dawson et al. | |
| 2008/0281529 A1 | 11/2008 | Tenenbaum et al. | |
| 2009/0323587 A1 | 12/2009 | Trachewsky et al. | |
| 2010/0008221 A1 | 1/2010 | Hong et al. | |
| 2010/0205116 A1 | 8/2010 | Erlanger | |

FOREIGN PATENT DOCUMENTS

| | | |
|---|---|---|
| WO | 9915960 | 4/1999 |
| WO | 03037009 | 5/2003 |
| WO | 2004001585 | 12/2003 |
| WO | 2006004628 | 12/2006 |

OTHER PUBLICATIONS

D. Zhu et al., "Using Cooperative Multiple Paths to Reduce File Download Latency in Cellular Data Networks."

Non-final Office Action dated Nov. 25, 2009 in U.S. Appl. No. 11/755,780.

Non-final Office Action dated Nov. 25, 2009 in U.S. Appl. No. 11/755,802.

Non-final Office Action dated Oct. 19, 2009 in U.S. Appl. No. 11/755,788.

Qui et al.. "Bandwidth in Ad Hoc Networks: A Price-Based Approach," 2003, IEEE, pp. 1-10.

Non-final Office Action dated Dec. 24, 2009 in U.S. Appl. No. 11/755,776.

Non-final Office Action dated Jan. 22, 2010 in U.S. Appl. No. 11/755,778.

Non-final Office Action dated Jan. 21, 2010 in U.S. Appl. No. 11/755,808.

Luo, Haiyun, Ramachandran Ramjee, Prasun Sinha, Li (Erran) Li, and Songwu Lu. "UCAN: A Unified Cellular and Ad-Hoc Network Architecture." MobiCom '03, Proceedings of the 9th Annual International Conference on Mobile Computing and Networking. New York, NY, USA: ACM Press, 2003, pp. 353-367.

Non-Final Office Action dated Mar. 4, 2010 in U.S. Appl. No. 11/755,775.
Final Office Action dated Mar. 5, 2010 in U.S. Appl. No. 11/755,788.
Non-Final Office Action dated Mar. 22, 2010 in U.S. Appl. No. 11/755,782.
Non-Final Office Action dated Mar. 18, 2010 in U.S. Appl. No. 11/755,763.
Non-Final Office Action dated Jan. 25, 2010 in U.S. Appl. No. 11/755,771.
Office Action dated Jan. 9, 2012 in U.S. Appl. No. 11/755,775.
Office Action dated Oct. 20, 2011 in U.S. Appl. No. 11/755,811.
Final Office Action dated Nov. 26, 2010 in U.S. Appl. No. 11/755,775.
Notice of Allowance dated Dec. 14, 2010 in U.S. Appl. No. 11/755,776.
Office Action dated Jan. 24, 2011 in U.S. Appl. No. 11/755,779.
Notice of Allowance dated Feb. 14, 2011 in U.S. Appl. No. 11/755,788.
Final Office Action dated Jan. 26, 2012 in U.S. Appl. No. 11/755,800.
Office Action dated Mar. 7, 2012 in U.S. Appl. No. 11/755,779.
Office Action dated Mar. 3, 2011 in U.S. Appl. No. 11/755,800.
Final Office Action dated Mar. 25, 2011 in U.S. Appl. No. 11/755,786.
Office Action dated Jun. 4, 2010 in U.S. Appl. No. 11/755,780.
Office Action dated Jun. 22, 2010 in U.S. Appl. No. 11/755,776.
Office Action dated Jul. 12, 2010 in U.S. Appl. No. 11/755,808.
Notice of Allowance dated Jun. 9, 2010 in U.S. Appl. No. 11/755,802.
Notice of Allowance dated Jun. 28, 2010 in U.S. Appl. No. 11/755,771.
Notice of Allowance dated Jul. 13, 2010 in U.S. Appl. No. 11/755,778.
Notice of Allowance dated Aug. 16, 2010 in U.S. Appl. No. 11/755,763.
Office Action dated Jul. 21, 2011 in U.S. Appl. No. 11/755,775.
Office Action dated Jul. 26, 2011 in U.S. Appl. No. 11/755,779.
Notice of Allowance dated Jun. 10, 2011 in U.S. Appl. No. 11/755,786.
Office Action dated Aug. 18, 2011 in U.S. Appl. No. 11/755,800.
Notice of Allowance dated Aug. 25, 2010 in U.S. Appl. No. 11/755,780.
Office Action dated Sep. 14, 2010 in U.S. Appl. No. 11/755,788.
Final Office Action dated Sep. 15, 2010 in U.S. Appl. No. 11/755,782.
Notice of Allowance dated Oct. 12, 2010 in U.S. Appl. No. 11/755,808.
Office Action dated Oct. 29, 2010 in U.S. Appl. No. 11/755,786.
IEEE 802.22, Wireless RANs, 220 pages, Mar. 2006.
Michelini et al, Spectral Sharing Across 2G-3G Systems, IEEE, 5 pages, 2003.
Das et al, A Structured Channel Borrowing Scheme for Dynamic Load Balancing in Cellular Networks, IEEE, 8 pages, 1997.
Final Office Action dated Apr. 12, 2012 in U.S. Appl. No. 11/755,811.
Notice of Allowance dated Jul. 5, 2012 in U.S. Appl. No. 11/755,779.

* cited by examiner

| Node Name | Node Type | Location | File Requested for Transfer | Price | Service Level Objective | Current Quality of Service |
|---|---|---|---|---|---|---|
|  |  |  |  |  |  |  |
|  |  |  |  |  |  |  |

FIG. 4

SYSTEM AND METHOD FOR FAIR-SHARING IN BANDWIDTH SHARING AD-HOC NETWORKS

CROSS-REFERENCE TO RELATED APPLICATIONS

This application is related to the following copending applications, all of which are incorporated herein by reference in their entireties: U.S. application Ser. No. 11/755,780; U.S. application Ser. No. 11/755,775; and U.S. application Ser. No. 11/755,808.

FIELD OF THE INVENTION

The invention generally relates to systems and methods for data transfer and, more particularly, to systems and methods for data transfer in bandwidth sharing ad hoc networks.

BACKGROUND OF THE INVENTION

Mobile computing is becoming increasingly pervasive, and will approach ubiquity in wireless devices (e.g., notebook computers, smart phones, personal digital assistants (PDAs), etc.) over the next decade. One consistent trend in this mobile computing space is the fact that such platforms increasingly communicate over a variety of wireless protocols. Common protocols in use today for wireless data transfer include EV-DO, IEEE 802.11a/b/g, ZigBee® (registered trademark of ZIGBEE ALLIANCE in the United States, other countries, or both), Bluetooth® (registered trademark of BLUETOOTH SIG, INC. in the United States, other countries, or both), and many other related protocols. By their very nature, differentials do exist, and will continue to exist, between the speed, or bandwidth, with which mobile devices can communicate with each other, vis-à-vis communications speeds with the broader network where a device's target data may reside.

It is often the case that a wireless device will have a relatively fast wireless connection to other local devices and a relatively slow wireless connection to the broader network (e.g., the Internet). For example, local wireless connections, provided by protocols such as IEEE 802.11a, 802.11b, 802.11g, 802.15.1 (e.g., Bluetooth®), and 802.15.4 (e.g., Zigbee®) provide fast data transfer rates of about 3 to 54 megabits per second (Mbps). However, such transfer protocols often have a limited maximum transmission range of about 30 to 300 ft. On the other hand, wireless telephony protocols (e.g., EV-DO, CDMA, EDGE, GPRS, etc.) have relatively large maximum transmission ranges on the order of miles, but only provide data transfer rates of about 10 kilobits per second (kbps) to 1 Mbps. Thus, while a user of a mobile device may enjoy relatively fast data transfer amongst local devices, the user is often limited to a slow wireless connection to the outside world (e.g., the Internet).

Accordingly, there exists a need in the art to overcome the deficiencies and limitations described hereinabove.

SUMMARY OF THE INVENTION

In a first aspect of the invention, a method comprises maintaining a borrower account and lender account of a borrower and a lender of an ad hoc network. The method further comprises adjusting at least one of the borrower account and the lender account based upon data transfer by the lender for the borrower.

In another aspect of the invention, a method comprises providing a computer infrastructure operable to maintain at least one of a borrower account associated with a borrower and a lender account associated with a lender of an ad hoc network. The computer infrastructure is further operable to at least one of debit the borrower account and credit the lender account based on borrowing and lending of bandwidth, respectively.

In another aspect of the invention, a computer program product comprises a computer usable medium having a computer readable program embodied in the medium, wherein the computer readable program when executed on a computing device causes the computing device to: maintain a borrower account associated with a borrower of an ad hoc network and maintain a lender account associated with a lender of the ad hoc network. The computer readable program further causes the computing device to at least one of credit the lender account and debit the borrower account.

In another aspect of the invention, there is a system comprising a server having a database containing data associated with a lender and a borrower in an ad-hoc network, and at least one of a hardware and software component configured to: maintain a borrower account and lender account of a borrower and a lender of an ad hoc network; and adjust at least one of the borrower account and the lender account based upon data transfer by the lender for the borrower.

In another aspect of the invention, there is a method comprising monitoring data transfer performed by at least one lender for a borrower in an ad hoc network and adjusting a balance of an account of the at least one lender and a balance of an account of the borrower based upon the data transfer. The method further comprises imposing a reduced rate of data transfer or preventing further data transfer when the balance of the account of the borrower falls below a predetermined level.

BRIEF DESCRIPTION OF THE DRAWINGS

FIG. 4 shows an example table created and used in implementing aspects of the invention.

DETAILED DESCRIPTION OF EMBODIMENTS OF THE INVENTION

The invention generally relates to systems and methods for data transfer and, more particularly, to systems and methods for data transfer in bandwidth sharing ad hoc networks. The invention allows a device with a relatively low bandwidth (e.g., low rate of data transfer) to leverage the bandwidth of other local devices to create a virtual high bandwidth (e.g., high rate of data transfer) connection. In exemplary implementations of the invention, an ad hoc network of wireless devices is established for transferring data from a remote location or locations to a member of the network via other members of the network. Alternatively, data may be transferred from a single member of the network to a remote location or locations via the other members of the network. In this manner, data may be transferred (e.g., downloaded, uploaded, etc.) in a parallel fashion, instead of serial fashion, thereby improving the speed and efficiency of data transfer. Moreover, implementations of the invention provide systems and methods for ensuring fair-sharing by the various actors (e.g., borrowers and lenders) in such bandwidth sharing ad hoc networks.

Figure 1:
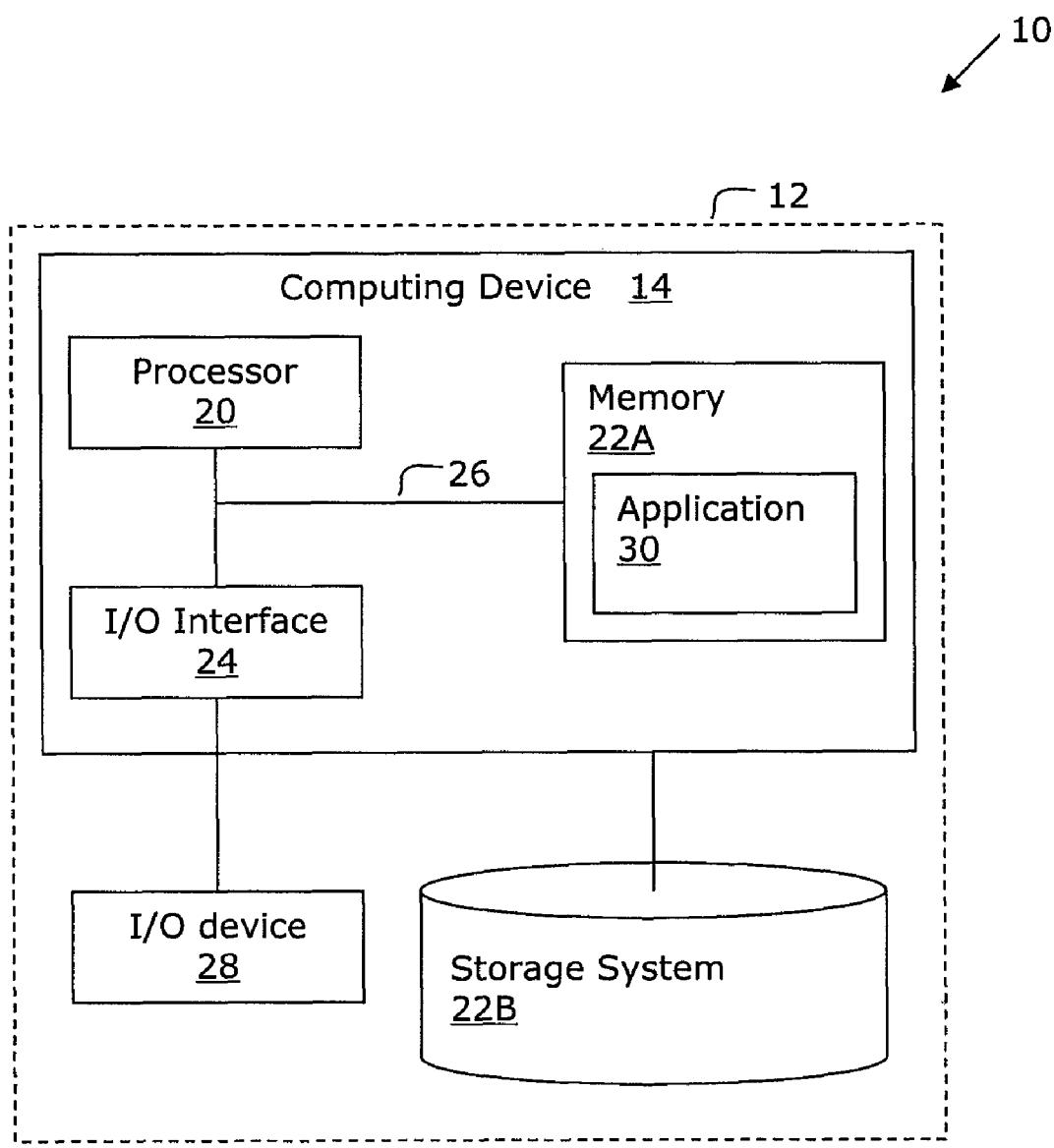
FIG. 1 shows an illustrative environment for implementing the steps in accordance with the invention.

FIG. 1 shows an illustrative environment 10 for managing the processes in accordance with the invention. To this extent, the environment 10 includes a computer infrastructure 12 that can perform the processes described herein. In particular, the computer infrastructure 12 includes a computing device 14 that comprises a management system 30, which makes the computing device 14 operable to perform the processes described herein, e.g., establish ad hoc networks, transfer data over ad hoc networks, establish and enforce fairness strategies, etc. The computing device 14 includes a processor 20, a memory 22A, an input/output (I/O) interface 24, and a bus 26. The memory 22A can include local memory employed during actual execution of program code, bulk storage, and cache memories which provide temporary storage of at least some program code in order to reduce the number of times code must be retrieved from bulk storage during execution. Further, the computing device 14 is in communication with an external I/O device/resource 28 and a storage system 22B. The external I/O device/resource 28 may be keyboards, displays, pointing devices, etc.

In general, the processor 20 executes computer program code, which is stored in memory 22A and/or storage system 22B. While executing computer program code, the processor 20 can read and/or write data to/from memory 22A, storage system 22B, and/or I/O interface 24. The bus 26 provides a communications link between each of the components in the computing device 14. The I/O device 28 can comprise any device that enables an individual to interact with the computing device 14 or any device that enables the computing device 14 to communicate with one or more other computing devices using any type of communications link.

The computing device 14 can comprise any general purpose computing article of manufacture capable of executing computer program code installed thereon (e.g., a personal computer, server, wireless notebook, smart phone, personal digital assistant, etc.). However, it is understood that the computing device 14 is only representative of various possible equivalent computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computer infrastructure 12 is only illustrative of various types of computer infrastructures for implementing the invention. For example, in embodiments, the computer infrastructure 12 comprises two or more computing devices (e.g., a server cluster) that communicate over any type of communications link, such as a network, a shared memory, or the like, to perform the processes described herein. Further, while performing the processes described herein, one or more computing devices in the computer infrastructure 12 can communicate with one or more other computing devices external to computer infrastructure 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

General Overview of Embodiments

"Ad hoc" relationships will become increasingly important in the communal sharing of immediately available resources, and most particularly, the sharing of bandwidth. With the creation of peer-to-peer networks and torrent-type services, a file may be stored in more than one location to allow very fast download of the file in sections simultaneously from multiple locations. Groups of devices may congregate, or coexist, in one place and each may have limited bandwidth to the outside world. However, the groups of devices may have high bandwidth to other devices within close proximity. An example of this is an IEEE 802.11g local area connection that creates a high-speed wireless connection between two cellular phone devices within close range, and wherein the cellular phones' cellular (e.g., wireless telephony) connection to remote locations provides bandwidth at less than $\frac{1}{100}^{th}$ of the local IEEE 802.11g connection.

The present invention is directed to systems and methods for establishing and enforcing fair-sharing strategies amongst members of bandwidth sharing ad hoc networks in which a single member of the network borrows bandwidth from other members of the network. Illustrative cases of data transfer to/from remote locations using peer-to-peer (P2P), non-gateway implementations are set forth in U.S. application Ser. No. 11/755,808. Illustrative cases of data transfer to/from a remote location using gateway implementations are set forth in U.S. application Ser. No. 11/755,780.

Figure 2A:
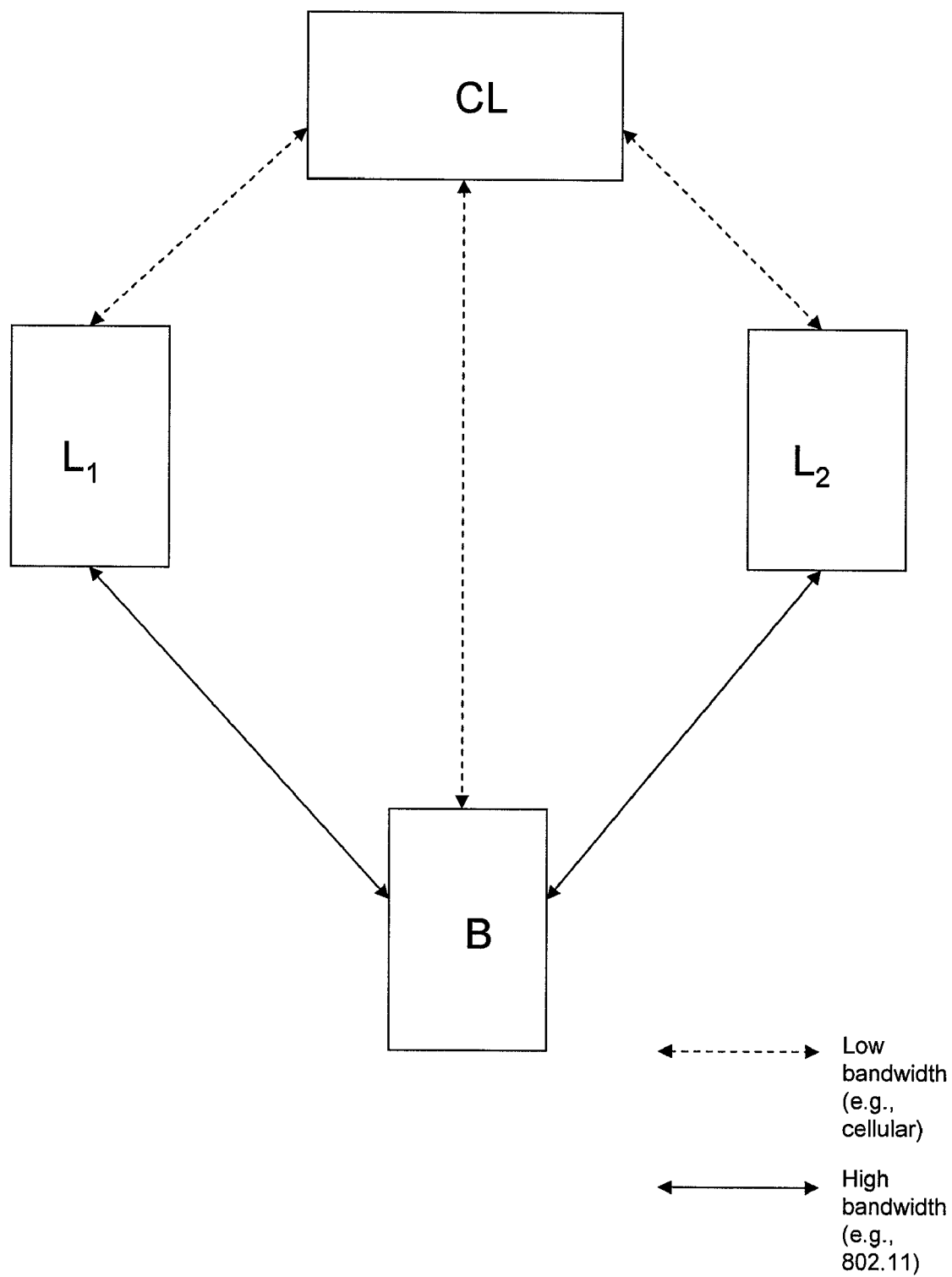
FIGS. 2A through 2D show peer-to-peer bandwidth-sharing ad hoc networks according to aspects of the invention.

FIGS. 2A through 2D show a general overview of a non-gateway, peer-to-peer (P2P) bandwidth sharing architecture. In these implementations, as shown in FIG. 2A, a borrower B may request information, e.g., transfer of files, from a central location, CL (or distributed locations). To increase its bandwidth capacity, the borrower B may request bandwidth from any of the lenders, $L_1$ or $L_2$ via any known wireless protocol. By way of example, upon a broadcast request from the borrower B, any of the lenders, $L_1$ or $L_2$ may allow the borrower B to use their excess (e.g., currently unused) bandwidth for file transfers with the central location, CL (or distributed locations). Upon authorization, the lenders, via a wireless protocol, for example, will download information from the central locations, CL (or distributed locations), and send this information to the borrower, B, thus effectively increasing the borrower's bandwidth. It should be understood that data could be transferred from distributed locations, rather than the central location, CL.

Figure 2B:
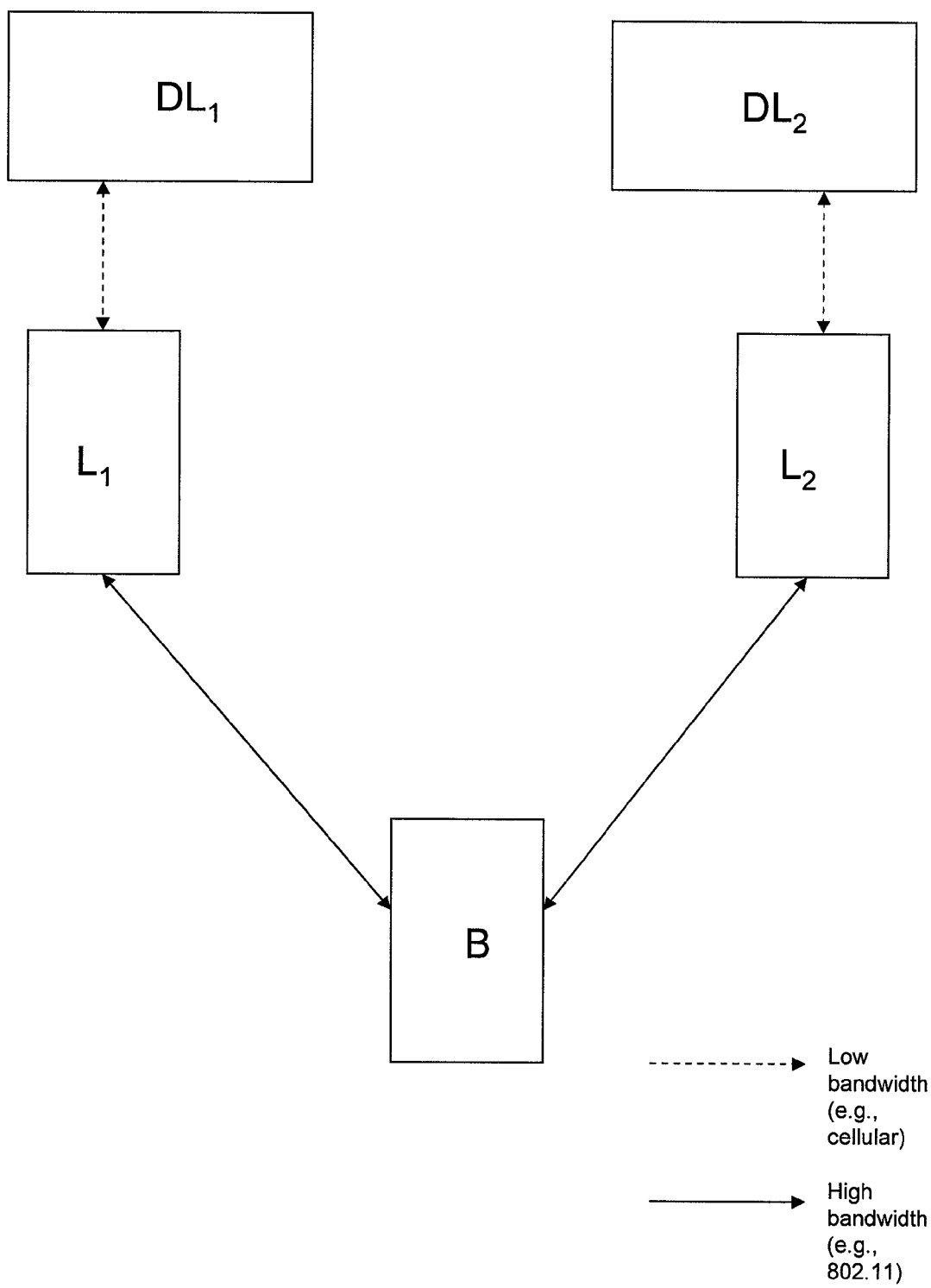

FIG. 2B is a general overview of a multiple source ad hoc network. In this implementation, a borrower B may request information, e.g., transfer of files, from distributed locations $DL_1$ and $DL_2$. Each distributed location $DL_1$ and $DL_2$ has a same copy of the requested data, and $L_1$ connects to $DL_1$ and $L_2$ connects to $DL_2$.

Figure 2C:
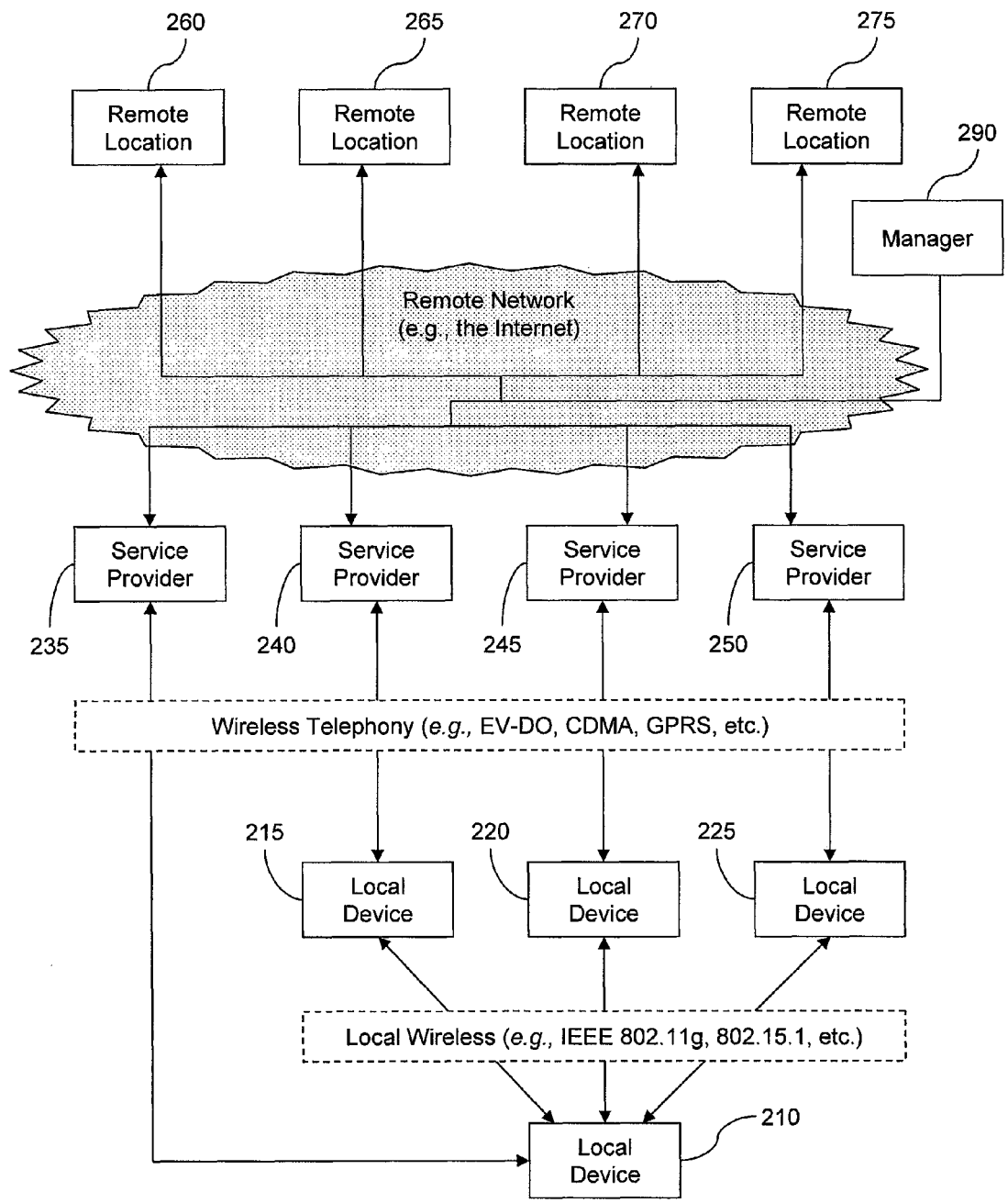

FIG. 2C is a more detailed overview of a non-gateway, peer-to-peer (P2P) bandwidth sharing architecture. In this implementation, a first node 210, second node 215, third node 220, and fourth node 225 each constitutes a respective wireless computing device such as, for example, a notebook computer, smart phone, personal digital assistant (PDA), etc. Each node 210, 215, 220, 225 has the ability to communicate (e.g., transfer data via known wireless protocols) with devices local to itself, as well as the ability to communicate with remote locations (e.g., the Internet) via an Internet Service Provider (ISP). Although four nodes are shown, any number of nodes can be used.

For example, the first node 210 may communicate with the second node 215 via any appropriate protocol, such as, for example, local wireless protocols IEEE 802.11a, 802.11b, 802.11g, IEEE 802.15.1 (i.e., Bluetooth®), IEEE 802.15.4 (e.g., Zigbee®), etc. Similarly, the first node 210 may communicate with each of the third and fourth nodes 220, 225, respectively, using any such protocol. In this manner, the first node 210 may transfer data (e.g., text file, word-processing document, spreadsheet, image file, multimedia file, etc.) to and/or from any one of the second, third, and fourth nodes 215, 220, 225.

The first node 210 may additionally communicate with a first ISP 235 via any appropriate wireless telephony (e.g., cellular) protocol, such as, for example, EV-DO, CDMA, EDGE, GPRS, etc. Similarly, second node 215 may communicate with a second ISP 240, third node 220 may communicate with a third ISP 245, and fourth node 225 may communicate with a fourth ISP 250 via any such wireless telephony protocol. The ISPs, in turn, provide connection to a remote network, such as the Internet. For example, the ISPs may provide connection to any number and type of remote locations 260, 265, 270, 275 on the Internet. Each remote location 260, 265, 270, 275 may comprise, for example, a computing device that is capable of storing data and transferring data to/from the various ISPs 235, 240, 245, 250, such as, for example, a desktop computer, server, etc., as shown in FIG. 1. In this manner, each node 210, 215, 220, and 225 may download and upload data from/to the Internet via their respective ISPs 235, 240, 245, 250. Although four ISPs and remote locations are shown, any number of ISPs and remote locations can be used. For example, two or more nodes may share a single ISP.

Still referring to the peer-to-peer implementations, the first node 210 is further provided with a peer-to-peer (P2P) networking capability, such as, for example, a torrent-type protocol such as BitTorrent® (registered trademark of BITTORRENT, INC. in the United States, other countries, or both). The P2P capability may be embodied in at least one of hardware, firmware, and software of the computing device of the first node 210. As is understood by the skilled artisan, torrent-type P2P protocols allow a device to separately download portions of a desired file from any of various remote locations, and then re-assemble the portions into the desired file.

The first node 210 may utilize the bandwidth of the other nodes 215, 220, 225 to increase the rate of data transfer between itself and the Internet. This is accomplished by the first node 210 instructing each node 215, 220, 225 to download a respective portion of the file and transfer that portion to the first node 210. The first node 210 then assembles the portions into the desired file using the torrent-type protocol. In this manner, the first node 210 overcomes its limited "skinny pipe" connection to the Internet by creating a "virtual fat pipe" by employing the bandwidth of the other nodes 215, 220, 225.

Also connected to the remote network is a manager 290. In embodiments, the manager 290 comprises a computing device (such as, for example, that described above with respect to FIG. 1) that is in communication with the nodes 210, 215, 220, 225. In accordance with aspects of the invention, the manager 290 may be structured and arranged to provide fair-sharing strategies amongst the participants of a bandwidth sharing ad hoc network, as described in greater detail below.

In embodiments, the invention provides a business method that performs the steps of the invention on a subscription, advertising, and/or fee basis. That is, the manager 290 (e.g., a service provider, such as a Solution Integrator) could offer to perform the processes described herein, such as, for example, provide fair-sharing strategies. In this case, the manager 290 can create, maintain, deploy, support, etc., a computer infrastructure that performs the process steps of the invention for one or more customers. In return, the manager 290 can receive payment from the customer(s) under a subscription and/or fee agreement and/or the service provider can receive payment from the sale of advertising content to one or more third parties.

Figure 2D:
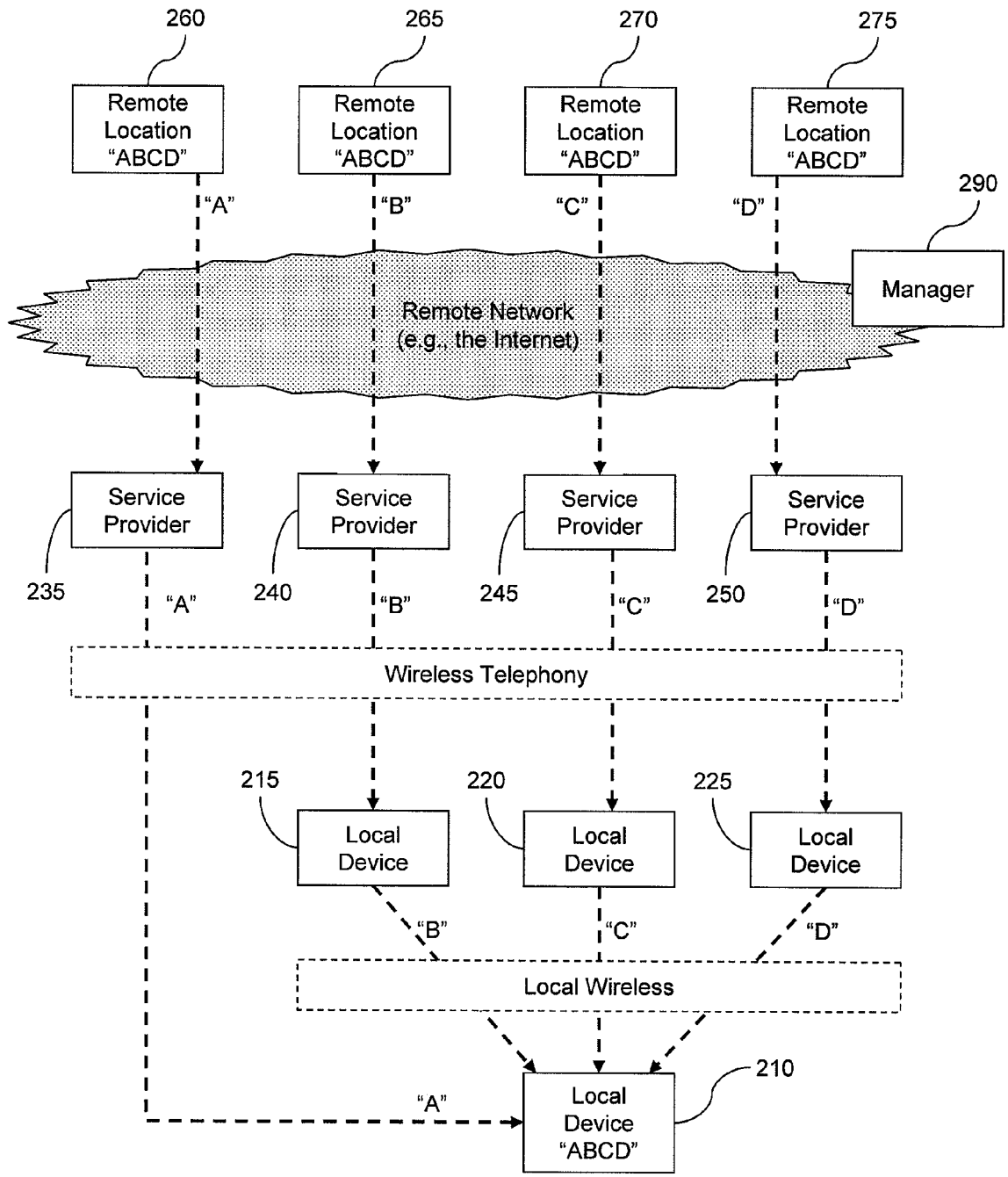

As depicted in FIG. 2D, a file made up of portions "ABCD" resides at each remote location 260, 265, 270, 275. The first node 210 downloads a first portion "A" of the file from the first remote location 260, the second node 215 downloads a second portion "B" from the second remote location 265, the third node 220 downloads a third portion "C" from the third remote location 270, and the fourth node 225 downloads a fourth portion "D" from the fourth remote location 275. The second, third, and fourth nodes transfer the respective portions to the first node, which reassembles the portions "A", "B", "C", "D" into the file "ABCD" using, for example, known torrent-type techniques.

As can be seen from the above-described example, the first node 210 uses the bandwidth of the other nodes 215, 220, 225 to effectuate a parallel, instead of serial, download of the file "ABCD". In this manner, such peer-to-peer ad hoc networks allow for faster downloading of the file to the first node 210.

To illustrate the improvement, assume file "ABCD" is 300 megabytes (MB) in size, and each node 210, 215, 220, 225 has a 1 megabit per second (Mbps) connection to its respective ISP. Further assume that the first node 210 has a 54 Mbps connection to each other node 215, 220, 225. In such a scenario, it would take about forty minutes for the first node 210 to download the file "ABCD" when acting alone. However, when the first node 210 utilizes the bandwidth of the other nodes 215, 220, 225, the download time in this example is reduced to about four minutes. It is noted that the number of nodes, ISPs, remote locations, and file portions described above are merely exemplary, and the peer-to-peer ad hoc network may be practiced with any appropriate number of nodes, ISPs, remote locations, and file portions.

Figure 3A:
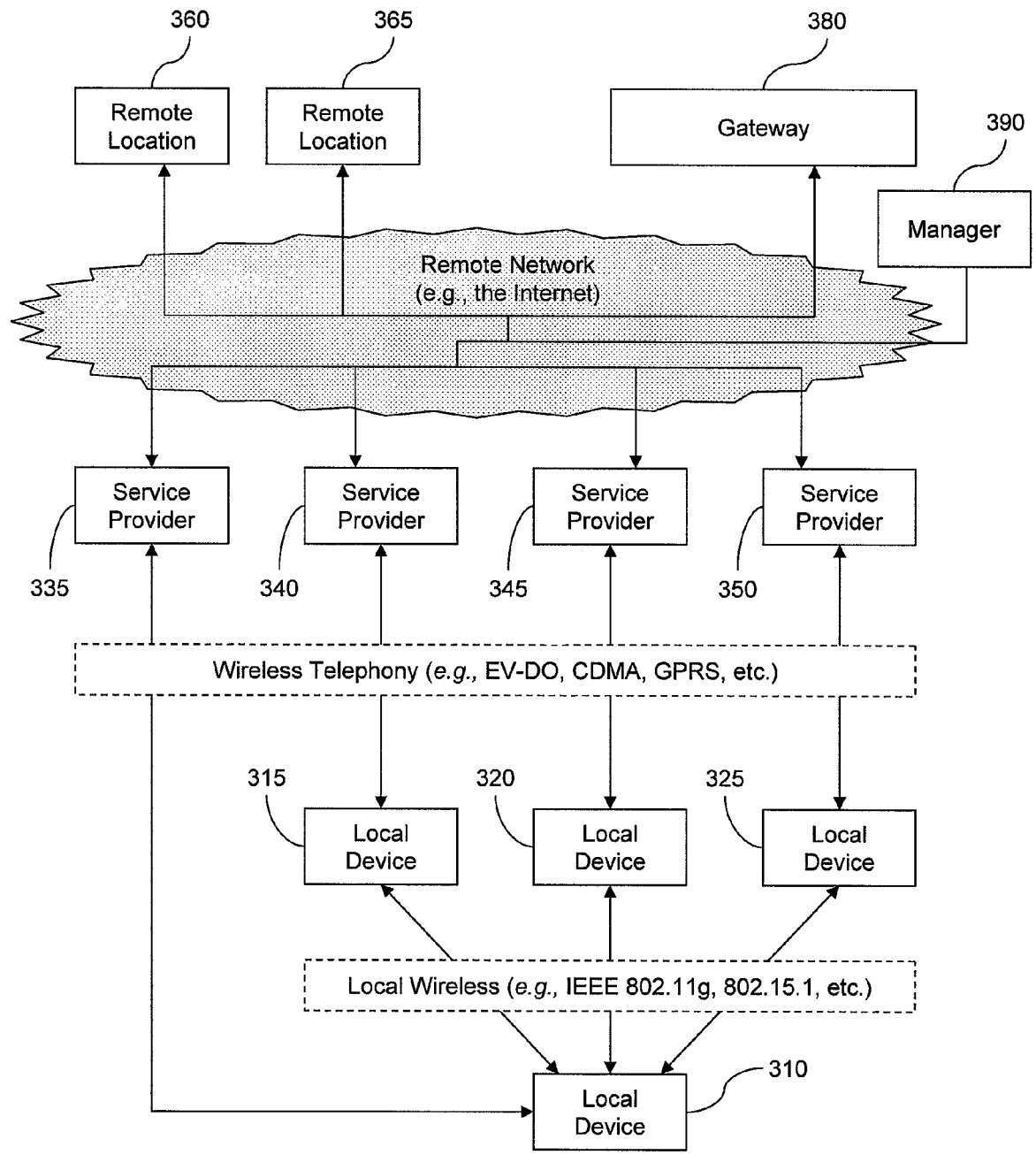
FIGS. 3A through 3C show gateway bandwidth-sharing ad hoc networks according to aspects of the invention.

FIG. 3A shows an overview of a gateway architecture of a bandwidth sharing ad hoc network. For example, a system comprises nodes 310, 315, 320, 325 and associated service providers (e.g., ISPs) 335, 340, 345, 350. Also shown is a first remote location 360 and a second remote location 365 of a remote network (e.g., the Internet). The nodes 310, 315, 320, 325, ISPs 335, 340, 345, 350, and remote locations 360, 365 are similar to those described above with respect to FIGS. 2A through 2D, such that the nodes may communicate with each other using local wireless protocols, the nodes may communicate with the ISPs using wireless telephony (e.g., cellular) protocols, and the ISPs may communicate with the remote locations over the remote network. The number of nodes, ISPs, and remote locations shown in FIG. 3A is merely exemplary, and any suitable number of nodes, ISPs, and remote locations may be used within the scope of the invention.

Also depicted in FIG. 3A is a gateway 380. The gateway 380 comprises any suitable computing device (such as, for example, that described with respect to FIG. 1) that is capable of data transfer with the ISPs 335, 340, 345, 350 and the remote locations 360, 365. For example, the gateway 380 may comprise a server that is connected to the ISPs 335, 340, 345, 350 and remote location 360, respectively, by a high speed connection (e.g., T3, cable, DSL, fiber, etc.). The gateway 380 possesses a bandwidth that is equal to or greater than the collective bandwidth of the nodes 310, 315, 320, 325, such that the gateway can facilitate substantially parallel data transfer to the nodes.

The gateway 380 further comprises file splitting and joining functionality. That is, the gateway 380 may operate to split a single data file into multiple smaller files that can later be joined to re-create the original file. Such splitting and joining functionality may be embodied in any combination of hardware and software of the gateway 380 computing device, and is known such that it does not require further explanation here. Moreover, the splitting and joining functionality may be performed on an suitable type of data file, such as text files, audio files, video files, documents, spreadsheets, etc. The splitting of a file may be thought of as a type of multiplexing, and, hence, the gateway 380 may also be referred to as a multiplexed gateway and/or a gateway multiplexer. Furthermore, although the splitting (e.g., multiplexing) and joining (e.g., demultiplexing) described herein differs from the torrent-type techniques referred to with respect to FIGS. 2C and 2D, the gateway 380 may additionally comprise torrent-type functionality.

Also connected to the remote network is a manager 390, which may be similar to that described above with respect to FIG. 2C. In accordance with aspects of the invention, the manager 390 may be structured and arranged to provide fair-sharing strategies amongst the participants of a bandwidth sharing ad hoc network, as described in greater detail below. For example, the manager 390 (e.g., a service provider, such as a Solution Integrator) could offer to perform the processes described herein, such as, for example, provide fair-sharing strategies. In this case, the manager 390 can create, maintain, deploy, support, etc., a computer infrastructure that performs the process steps of the invention for one or more customers. In return, the manager 390 can receive payment from the customer(s) under a subscription and/or fee agreement and/or the service provider can receive payment from the sale of advertising content to one or more third parties.

Figure 3B:
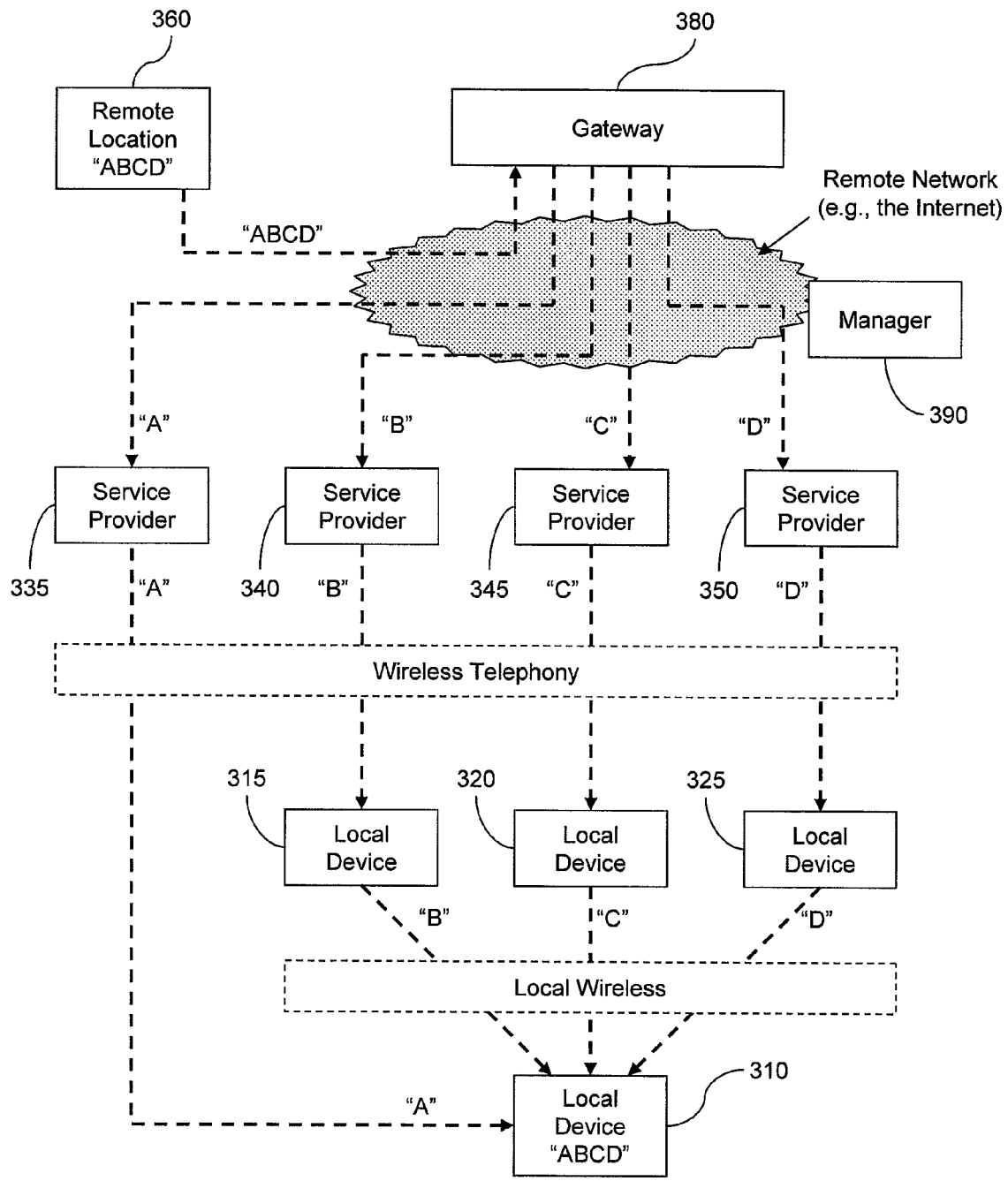

As depicted in FIG. 3B, a file made up of portions "ABCD" resides at remote location 360. The gateway 380 downloads the entire file "ABCD" from remote location 360 and splits the file into first portion "A", second portion "B", third portion "C", and fourth portion "D". The gateway sends first portion "A" to the first node 310, second portion "B" to the second node 315, third portion "C" to the third node 320, and fourth portion "D" to the fourth node 325. The second, third, and fourth nodes transfer the respective portions to the first node, which rejoins the portions "A", "B", "C", "D" into the file "ABCD" using, for example, known file rejoining techniques.

As can be seen from the above-described example, the first node 310 uses the bandwidth of the other nodes 315, 320, 325 to effectuate a parallel, instead of serial, download of the file "ABCD". In this manner, the invention allows for faster downloading of the file to the first node 310.

To illustrate the improvement, assume file "ABCD" is 300 megabytes (MB) in size, and each node 310, 315, 320, 325 has a 1 megabit per second (Mbps) connection to its respective ISP. Further assume that the first node 310 has a 54 Mbps connection to each other node 315, 320, 325. In such a scenario, it would take about forty minutes for the first node 310 to download the file "ABCD" when acting alone. However, when the first node 310 utilizes the bandwidth of the other nodes 315, 320, 325 in accordance with the invention, the download time in this example is reduced to about four minutes. It is noted that the number of nodes, ISPs, remote locations, and file portions described above are merely exemplary, and the invention may be practiced with any appropriate number of nodes, ISPs, remote locations, and file portions.

Figure 3C:
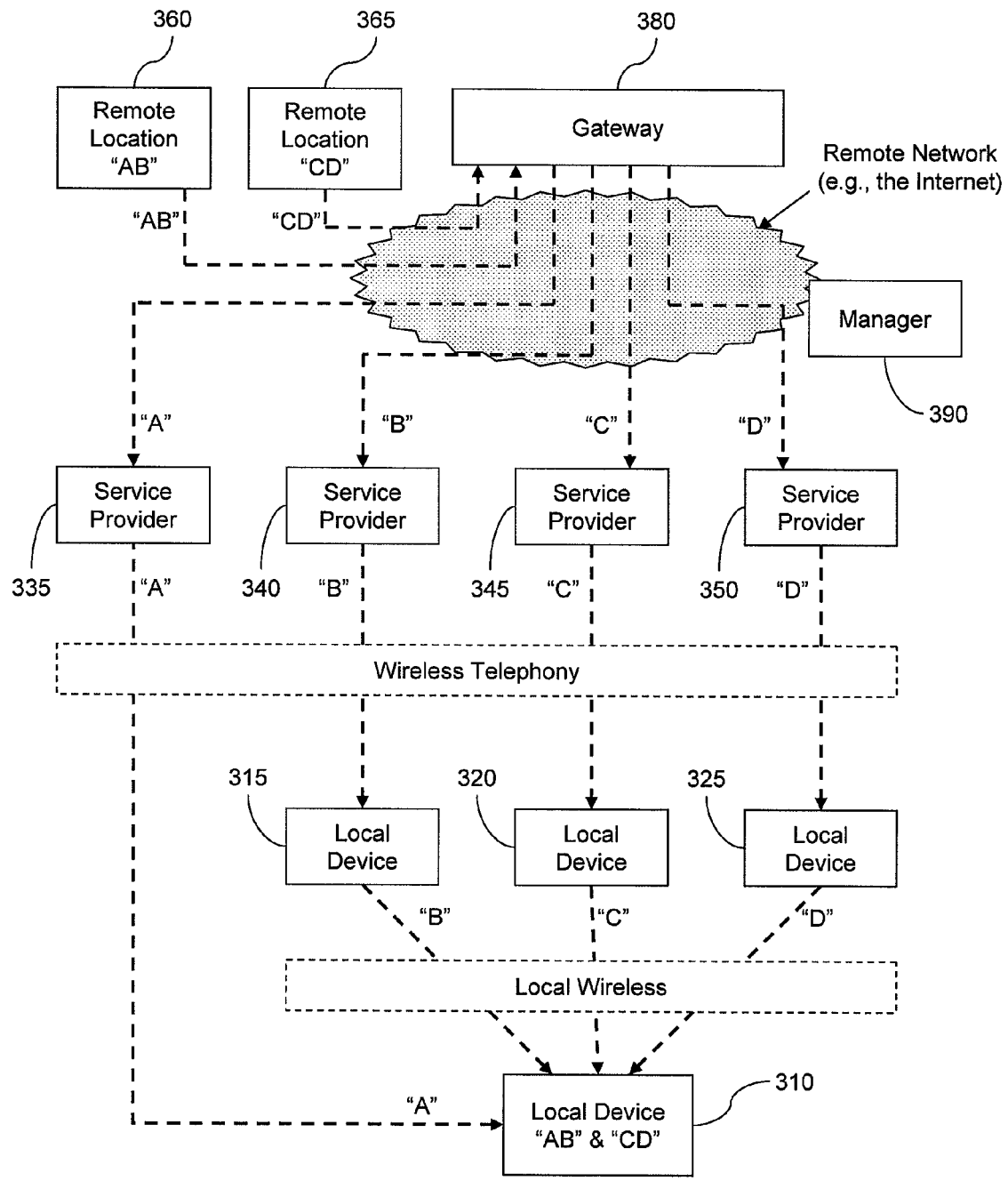

An additional implementation of a gateway environment is shown in FIG. 3C, in which plural files may be downloaded. A first file "AB" resides at first remote location 360, and a second file "CD" resides at second remote location 365. The gateway 380 downloads the entire file "AB" from the first remote location 360 and the entire file "CD" from the second remote location. The gateway 380 splits the first file "AB" into portions "A" and "B", and splits the second file "CD" into portions "C" and "D". The gateway 380 sends first portion "A" to the first node 310, second portion "B" to the second node 315, third portion "C" to the third node 320, and fourth portion "D" to the fourth node 325. The second, third, and fourth nodes transfer the respective portions to the first node, which rejoins the portions into files "AB" and "CD" using, for example, known file rejoining techniques.

Initial Formation of the Ad Hoc Network

In either the peer-to-peer or gateway environments described above, in order to form a new ad hoc network, a borrower may scan all available potential lenders and prioritize the potential lenders for a data transfer. The formation of the ad hoc network, in embodiments, may use a 'borrower/lender' table as shown in FIG. 4. In this example, the borrower or gateway (e.g., multiplexer) will broadcast the table to potential lenders which, in turn, will return the table, with information pertinent to the lender, to the borrower or the gateway. Using this information, the borrower or lender can establish an ad hoc network with lenders that meet certain criteria, e.g., reliability, speed, availability and/or costs.

In the borrower/lender table of FIG. 4, the "Node Name" column may be the unique identifier of a node such as the borrow and lenders. For example, this could be a hostname, a Bluetooth® name or any other information that can uniquely describe the node. The "Node Type" column may describe whether this node is a borrow, a lender, or a gateway. The "Location" column may be an IP address, Wi-Fi address, Bluetooth address, MAC address or any other attribute that can be used to locate the node. The "File Requested for Transfer" column may be used to store information about the file (or piece of file) to be transferred. This may be an HTTP address, an FTP address or other information to describe where the data is to be found. The "Service Level Objective" column may describe the negotiated service levels of the node. For example, the requested bandwidth, the availability of the node, reliability and so forth. The "Current Quality of Service" column may contain the current quality of service (QoS) of the node. The QoS information may contain a status of the node, e.g., how well the service levels are being met, the current transfer rate, or the current progress of the file download.

The "Price" column may be a price set by the lender to use the lender's bandwidth. The price may be stated in a price/data volume, a price/time, a price/data volume and a price/time, a price/time with a data cap, or a one-time price. Additionally the price may be stated as a number of minutes to be used in a wireless service plan or any other charging mechanism.

In aspects of the invention, a borrower and a lender may not see all of the table on their respective devices, and some of the table information may be generated automatically. The user interface may require less display space and may require less user input. For example, the location of a lender's device or borrower's device may be known by the device itself. Thus, the user may not need to complete this portion of the table. Rather, the information for that portion of the table would be automatically completed by the device. Furthermore, the automatic generation of the information in the table may also apply to the Node Type, Node Name, Service Level Objective, Price and Current Quality of Service columns. For example, a borrower may have preset levels of service level objectives that they require whenever they borrow bandwidth, so that generation of the Service Level Objective column may be performed automatically by the borrower's device. Additionally, a potential lender may have a set price for lending bandwidth already input into their device, such that the Price column information is automatically generated.

In one illustrative example, a borrower may initially generate the table by clicking on an icon, and when prompted, input the File Requested for Download information. The borrower's device could generate the remaining portions of the information in the table. When a potential lender receives the borrower's request, their device may simply prompt for a decision to be a lender. If the potential lender answers "yes", then their device may prompt the potential lender for a price. As set forth above, the rest of the information in the table may be generated automatically. Illustrative cases of formation and rearrangement of a bandwidth-sharing ad hoc network architecture are set forth in U.S. application Ser. No. 11/755,775.

Fair-Sharing Strategies

According to aspects of the invention, and in either the peer-to-peer or gateway environment as described above, fair-sharing strategies may be imposed upon the participants of a bandwidth sharing ad hoc network. In embodiments, this is accomplished using a points system. For example, each user may have an account that is credited with points for lending bandwidth and debited points for borrowing bandwidth. By imposing rules where points are required to borrow bandwidth, such a system ensures that users share fairly with other users.

In embodiments, the fair-sharing strategies are accomplished through the use of a manager, such as manager 290, 390, described above. The manager comprises a computing device having hardware and/or software structured and arranged to communicate with and maintain an account for each device (e.g., node) of an ad hoc network. Each device, in turn, comprises hardware and/or software structured and arranged to communicate with the manager. For example, before a bandwidth borrowing session begins, a potential lender communicates with the manager to determine if a prospective borrower has sufficient points for the planned borrowing. Upon confirmation from the manager, the borrowing session commences. After the borrowing session is complete, the borrower and lender(s) communicate the exact terms of the borrowing to the manager so that their respective accounts may be credited and debited accordingly.

In implementations, a user registers with a manager and opens an account before being able to participate in bandwidth sharing ad hoc networks. This may be accomplished in any known manner, such as, for example, registering online at a manager web site. Upon initial creation of an account, the user has an account balance of, for example, zero points. It is noted, however, that any suitable amount of points may be assigned to a new account. For example, as a promotional incentive, a user may be given predetermined amount of points, e.g., twenty five points (instead of zero), upon opening a new account.

With an account balance of zero points, the user cannot yet borrow bandwidth. However, the user may earn points by lending bandwidth to others. Additionally or alternatively, the user may purchase points from the manager or from other users. By requiring users to either earn or purchase points before they can borrow bandwidth from others, the systems and methods of the invention impose fair-sharing rules that prevent a user from predominantly borrowing and rarely lending.

The number of points exchanged between borrower and lender may be determined in any suitable manner. For example, the borrower and lender may negotiate an amount of points that will be exchanged. Alternatively, the manager may set fixed rates at which borrowers and lenders earn and lose points.

Processes of the Invention

The steps of the flow diagrams described herein may be implemented in the environment of FIG. 1. The flow diagrams may equally represent a high-level block diagram of the invention. The steps of the flow diagrams may be implemented and executed from a server, in a client-server relationship, by computing devices in an ad hoc network, or they may run on a user workstation with operative information conveyed to the user workstation. Additionally, the invention can take the form of an entirely hardware embodiment, an entirely software embodiment or an embodiment containing both hardware and software elements. In an embodiment, the software elements include firmware, resident software, microcode, etc.

Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Figure 5:
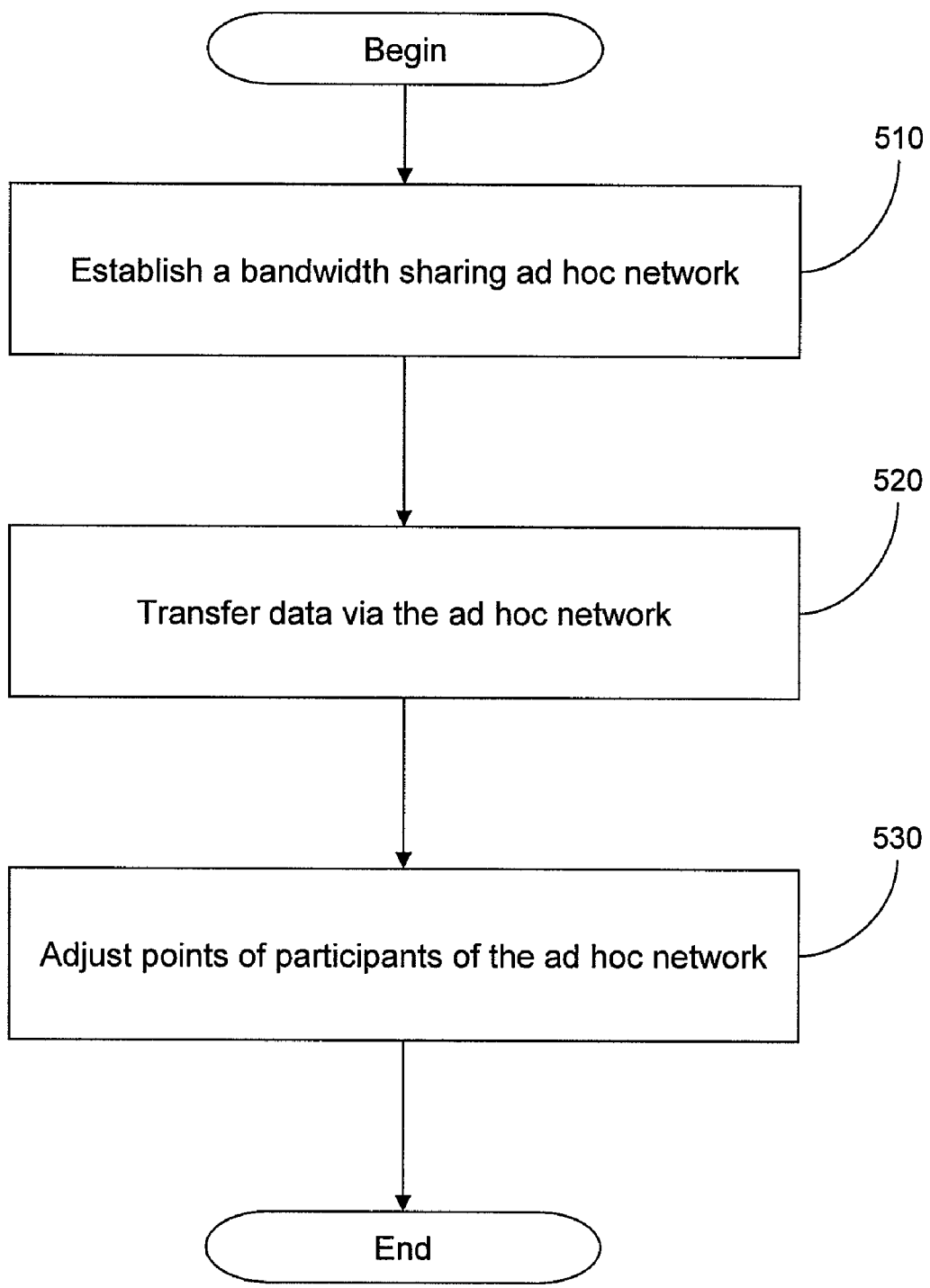
FIGS. 5-7 show flow diagrams depicting implementations of methods according to aspects of the invention.

FIG. 5 shows a flow diagram depicting steps of a first method for transferring data according to aspects of the invention. At step 510, a bandwidth sharing ad hoc network is formed. In embodiments, this comprises a borrower determining the target location(s) of data to download or upload, finding potential lenders, and choosing lenders. This may be accomplished as described above with respect to FIGS. 2A through 4. Furthermore, illustrative cases of formation and rearrangement of a bandwidth-sharing ad hoc network architecture are set forth in U.S. application Ser. Nos. 11/755,780, 11/755,775, and U.S. application Ser. No. 11/755,808.

In embodiments, step 510 further includes a determination of points to be exchanged for the bandwidth sharing. For example, the borrower and lender may negotiate a rate of points for bandwidth, such as, one point per megabyte (MB) downloaded by the lender for the borrower. Instead of a negotiated rate, a manager may impose a flat rate of points for bandwidth. For example, the flat rate may be such that for each MB borrowed by a borrower from a lender, the borrower's account is debited two points and the lender's account is credited with one point. It is understood that the values of the rates described here are merely exemplary, and any suitable rates may be used within the scope of the invention.

Step 510 may further include a determination of whether the borrower has sufficient points for the planned borrowing of bandwidth. For example, the manager may examine the borrower's account to determine if the borrower has sufficient points for the amount of bandwidth to be borrowed at the established rate. The manager then informs the lender(s) that the borrower has, or does not have, sufficient points for the planned borrowing.

After formation of the ad hoc network, the data is transferred at step 520. In implementations, this comprises downloading or uploading data in substantially parallel fashion using at least one lender of the ad hoc network. For example, the transfer of data may be accomplished as described above with respect to FIGS. 2D, 3B, and 3C.

At step 530, the points of each user are adjusted. In embodiments, the points are adjusted at the completion of data transfer. For example, the borrower may communicate to the manager that the data transfer is complete and how much bandwidth was borrowed from each lender. At such time, the manager may credit the lender's account and debit the borrower's account accordingly.

Alternatively, points may be adjusted at intervals during the data transfer. For example, during the data transfer, points may be debited from the borrower's account and credited to the lender's account as each MB of data is transferred. It is noted that the interval may be based upon any suitable parameter, such as for example, time spent lending, amount of data lent, etc.

The following are detailed examples of the general method that is described above with respect to FIG. 5.

Figure 6:
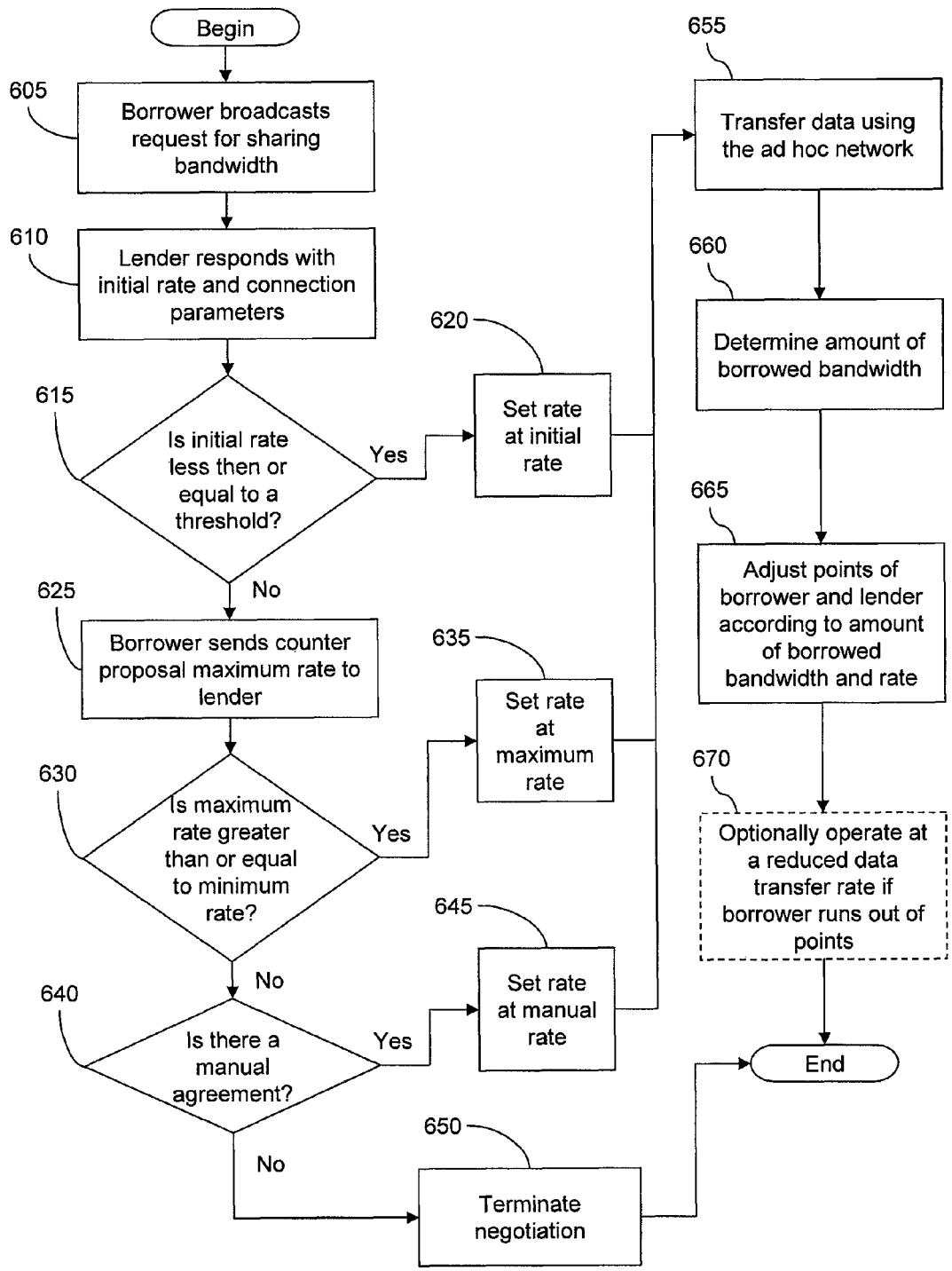

FIG. 6 shows a flow diagram depicting steps of an implementation of a method for transferring data with fair-sharing according to aspects of the invention. This implementation is directed to a negotiated rate of points between the borrower and lender. The implementation is described with respect to a single lender, although it is understood that more than one lender may be used. At step 605, the borrower broadcasts a request for sharing bandwidth. This may be accomplished as described above with respect to FIG. 4.

At step 610, the lender informs the borrower of the lender's initial rate (e.g., three points per MB) and of the lender's connection parameters (e.g., speed, quality of connection, etc.) In embodiments, this communication from the lender to the borrower is automatic upon receipt of a request for bandwidth from a lender. For example, a lender may set a predefined initial rate for offering to lend bandwidth (e.g., three points per MB downloaded for a borrower). Moreover, the lender may set a predefined minimum rate at which the lender is willing to lend bandwidth (e.g., one point per MB downloaded for a borrower). The initial rate and minimum rate may be designated by the user of a lender device through a graphical user interface that allows the user to enter such values by typing, slide bar, etc. The communication from the lender to the borrower in step 610 contains only the lender initial rate and parameters of connection, and does not contain the lender's minimum rate.

At step 615, the borrower determines if the lender's initial rate is acceptable. In embodiments, the borrower comprises hardware and/or software that enables the user of a borrower device to set predefined thresholds based upon connection parameters. The borrower's predefined thresholds may be, for example, that the borrower is willing to pay up to five points per MB for a lender having a wireless telephony connection speed of one Mbps, but only one point per MB for a lender having a wireless telephony connection speed of one hundred Kbps. In implementations the borrower predefined thresholds are set by the borrower in a software graphical user interface options menu by numerical designation, slide bar, etc., although other techniques may be used. Multiple thresholds that are based upon various connection parameters (e.g., speed, reliability, etc.) may be stored in the borrower device, for example, in a look-up table.

If the lender initial rate is less than or equal to a borrower predefined threshold for the reported connection parameters (i.e., the initial rate is acceptable to the borrower), then at step 620 the agreed rate is set to the initial rate and the method proceeds to step 655.

If, however, the lender initial rate is greater than the borrower predefined thresholds (i.e., the initial rate is unacceptable to the borrower), at step 625 the borrower communicates back to the lender what the borrower is willing to pay. In implementations, the borrower sends a counterproposal to the lender informing the lender of the borrower's predefined threshold rate (e.g., the maximum rate the borrower is willing to pay based upon the lender's reported connection parameters). For example, if the lender initial rate is three points per MB at a connection speed of ninety-five Kbps, the borrower may send a message to the lender informing the lender that the initial rate is unacceptable but that the borrower is willing to pay one point per MB for such a connection speed.

At step 630, the lender determines if the borrower's maximum rate is acceptable by comparing the borrower's maximum rate to the lender's minimum rate. In embodiments, if the borrower's maximum rate is greater than or equal to the lender's minimum rate, then at step 635 the agreed rate is set to the borrower's maximum rate and the method proceeds to step 655.

According to aspects of the invention, the borrower device and lender device each comprise hardware and/or software (e.g., such as that described with respect to FIG. 1) that automatically performs steps 610 through 635 upon initiation by the borrower at step 605. For example, the lender initial rate and minimum rate may be predefined by a user of the borrower device, as described above. Moreover, a borrower threshold (or table of thresholds) may be predefined by a user of a borrower device, as described above. The communication of the various rates between the borrower device and lender device may be programmed to occur automatically. In this manner, a form of automatic negotiation is provided.

However, if an agreed rate cannot be reached automatically, the borrower and/or lender may manually intervene at step 640. For example, both the borrower device and the lender device may display a message to its respective user that an agreed rate is not met. At this point, the borrower may opt to change the maximum rate and/or lender may opt to change the minimum rate. In embodiments, this is accomplished via a graphical user interface of the borrower device and lender device, and may further comprise messaging (e.g., email, text messaging, etc.) between the users of the devices. If the users manually agree upon a rate, then at step 645 the agreed rate is set to the manually agreed rate and the method proceeds to step 655.

If however, the borrower and lender cannot manually agree to a rate in step 640, then at step 650 the borrower and lender terminate negotiations and the borrower does not borrow bandwidth from this particular lender. It is noted, however, that the borrower may still negotiate with and borrow from other lenders.

At step 655, the lender begins transferring data for the borrower. This may comprise downloading and/or uploading in either a peer-to-peer or gateway environment.

At step 660, as data is being transferred, the lender periodically sends a report to a manager of how much data is transferred and the agreed rate. Alternatively, the manager may monitor the data transfer to determine how much data has been borrowed over a period of time. At step 665, the manager adjusts the account balance of borrower and lender according to how much data has been transferred. For example, if the agreed rate is one point per MB, and the lender reports that two MB were borrowed downloaded for the borrower, then the manager will debit the borrowers account by two points and credit the lender's account by two points. Steps 660 and 665 may be performed at any appropriate periodic interval (e.g., once every sixty seconds) during the data transfer. Upon completion of the data transfer, the ad hoc network may be disassembled.

If the balance of the borrower's account falls below a predetermined level (e.g., zero points) before completion of the data transfer, the lender may simply stop transferring data on behalf of the borrower. Alternatively, as shown in optional step 670, the lender may continue to lend bandwidth to the borrower at a throttled (e.g., reduced) data transfer rate. In embodiments, when the borrower runs out of points during data transfer, the manager sends a message informing the lender of that the borrower has no more points. The lender may agree to continue transferring data for the borrower at a throttled transfer rate so that the borrower may complete the data transfer. For example, the lender may reduce the data transfer rate from one Mbps to five kbps until the data transfer is complete. In this manner, the borrower is protected from incomplete data transfers, and the lender reclaims bandwidth to use for other purposes.

In implementations, the lender may agree to such throttled data transfer rate operation upon opening an account with a manager. For example, upon opening an account with the manager, a user may be asked if he or she is willing to allow such throttled data transfer. Alternatively, upon the borrower running out of points during data transfer, the manager may send a message to the lender prompting the lender to either agree to the throttled transfer rate or quit lending bandwidth. If the lender agrees, then data transfer continues at the throttled transfer rate, as described above. However, if the lender disagrees, then data transfers halts, and the ad hoc network is terminated. Alternatively or additionally, the manager may automatically impose the throttled transfer rate or prevent further data transfer. Although the throttled transfer rate has been described as five kbps, any suitable value may be used within the scope of the invention.

Figure 7:
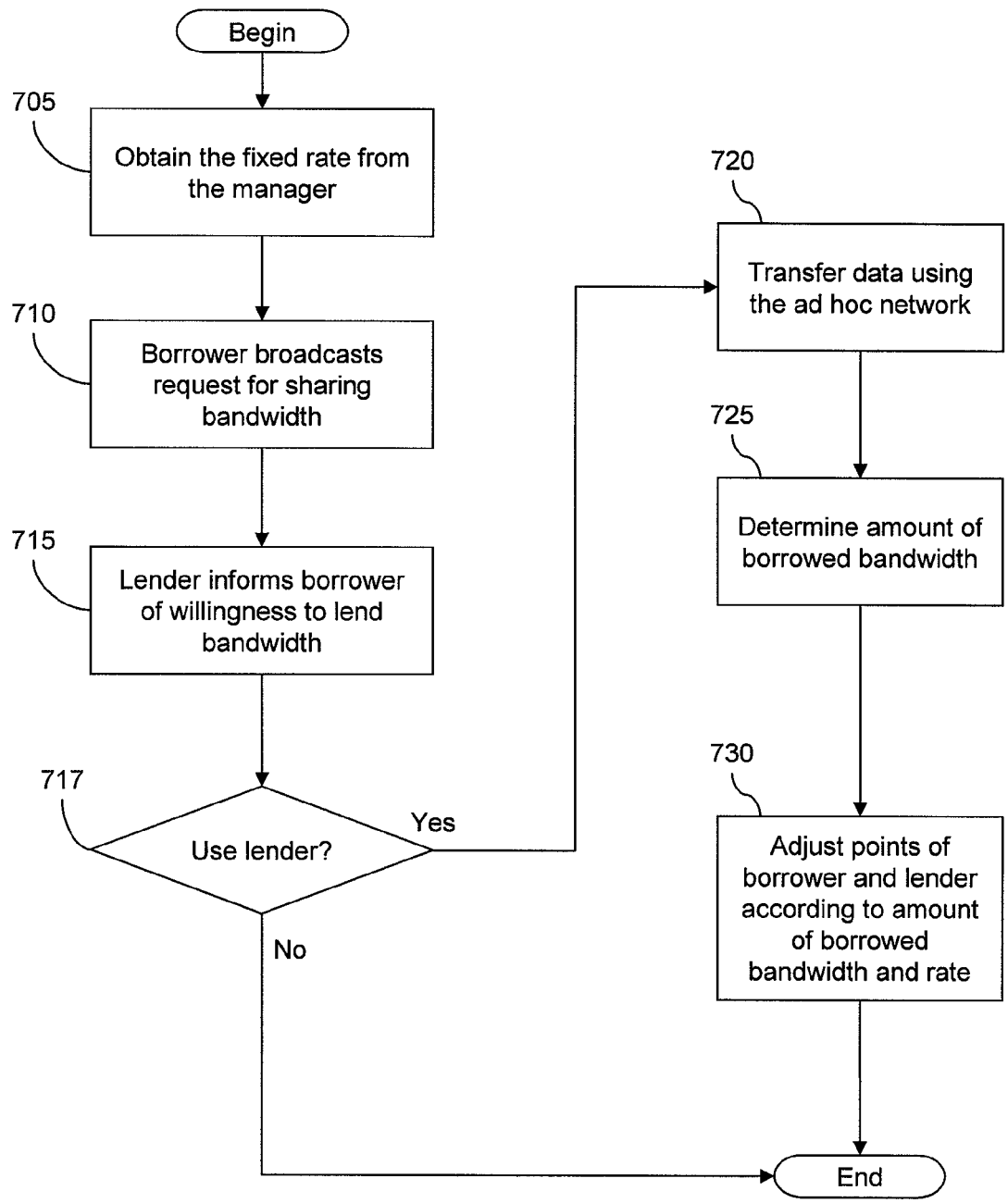

FIG. 7 shows a flow diagram depicting steps of another implementation of a method for transferring data with fair-sharing according to aspects of the invention. This implementation is directed to a fixed rate of points that is set by a manager. The fixed rate may be set at any suitable value, such as, for example, one point credit for the lender and one point debit for the borrower for each one MB borrowed. Another example, useful for generating revenue for a manager service provider that also sells points, is one point credit for the lender and two points debit for the borrower for each one MB borrowed. As with FIG. 6, the implementation depicted in FIG. 7 is described with respect to a single lender, although it is understood that more than one lender may be used.

At step 705, the fixed rate is obtained from the manager. In embodiments, this is accomplished by the borrower and/or lender sending a request to the manager for the current fixed rate. Alternatively, the fixed rate may be periodically pushed to the borrower and/or lender (e.g., all account holders) by the manager.

At step 710, the borrower broadcasts a request for sharing bandwidth. In embodiments, the request includes the data location and the fixed rate. At step 715, the lender informs the borrower of a willingness to lend bandwidth at the fixed rate. In embodiments, the lender also includes connection parameters (e.g., connection speed, available bandwidth, etc.) Steps 710 and 715 may be accomplished as described above with respect to FIG. 4.

At step 717, the borrower decides whether to use the lender, or not. In embodiments, the borrower makes such a decision based upon the lender's connection parameters. If the connection parameters are satisfactory to the borrower, the method proceeds to step 720. However, if the lender's connection parameters are not satisfactory to the borrower, then the borrower will not borrow from this lender and the relationship between the borrower and lender ends.

At step 720, the lender begins transferring data for the borrower. At step 725, as data is being transferred, the lender periodically sends a report to a manager of how much data is transferred. At step 730, the manager adjusts the account balance of borrower and lender accordingly. Steps 720 through 730 may be performed similarly to steps 655 through 665, as described above.

Upon completion of the data transfer, the ad hoc network is disbanded. However, if the borrower's account runs out of points during the data transfer before completion of the data transfer, the lender may simply stop transferring data on behalf of the borrower or operate at a throttled transfer rate, as described above with respect to FIG. 6.

Although the implementations of FIGS. 6 and 7 have been described with respect to one lender, it is within the scope of the invention for the borrower to simultaneously arrange borrowing from plural lenders. In such situations, to ensure that the borrower possesses enough points to accommodate all of the lenders, the manger may use virtual escrow accounts. For example, while negotiating with plural lenders, the borrower's device provides to the manager the names of the lenders they have requested bandwidth from and the estimation of the number of points that will be needed for each lender. The manager creates a virtual escrow account for each one of the lenders, and moves the respective estimated number of points to each respective virtual escrow account. As each lender transfers data for the borrower, the manager transfers the points from the virtual escrow account to the lender's account. Any points remaining in any of the virtual escrow accounts upon the dissembling of the ad hoc network are credited back to the borrower's account.

In embodiments of the invention, each device of an ad hoc network comprises hardware and/or software (e.g., similar to that described with respect to FIG. 1) that performs some or all of the functions described herein. For example, a wireless device may download and install a software application that allows the wireless device to perform at least one of: establish a relationship with a gateway, broadcast requests for borrowing bandwidth, respond to requests for borrowing bandwidth, generate a borrower/lender table, determine lender solutions, set predefined initial, minimum, and maximum rates, etc. Such software may, for example, be created by and available for download from a service provider. In even further implementations, the manager may be the service provider.

In any of the examples and implementations described above, the fair-sharing points system may be augmented by some form of monetary payment, either directly or indirectly, from the borrower to the lender. If additional payment methods are used, fixed-price payment policies may be established based upon factors such as: volume of data transferred by a lender for a borrower, amount of time a lender is transferring data for a borrower, etc. Moreover, variable price payment policies may be established as an alternative to the above-described fixed-price payment policies. For example, a price may be negotiated between a borrower and lender.

While the invention has been described in terms of embodiments, those skilled in the art will recognize that the invention can be practiced with modifications and in the spirit and scope of the appended claims. For example, while the embodiments have been described with one, two, or three lenders, those skilled in the art will recognize that the invention can be practiced with any number of lenders, files, file portions, ISPs, and/or remote locations.

What is claimed:

1. A method, comprising:
    maintaining a borrower account and lender account of a bandwidth borrower and a bandwidth lender of a bandwidth sharing ad hoc network; and
    adjusting at least one of the borrower account and the lender account based upon data transfer by the bandwidth lender for the bandwidth borrower,
    wherein at least one of the maintaining and the adjusting is performed by a processor comprised in a computing device;
    the adjusting comprises at least one of crediting the lender account and debiting the borrower account; and
    the crediting comprises crediting points and the debiting comprises debiting points, and further comprising offering points for sale.

2. The method of claim 1, wherein the crediting and the debiting are performed at a predetermined rate.

3. The method of claim 2, wherein the predetermined rate is a fixed-rate.

4. The method of claim 2, wherein the predetermined rate is a negotiated rate between the borrower and the lender.

5. The method of claim 2, wherein the predetermined rate is an automatically negotiated rate between the borrower and the lender.

6. The method of claim 1, wherein:
    the crediting the lender account comprises debiting an escrow account, and
    the debiting the borrower account comprises crediting the escrow account.

7. The method of claim 1, wherein the steps of claim 1 are provided by a service provider under at least one of: a subscription agreement, a fee agreement; and based on advertising content to one or more third parties.

8. The method of claim 1, wherein a service provider at least one of creates, maintains, deploys and supports a computer infrastructure that performs the steps of claim 1.

9. The method of claim 1, further comprising imposing a reduced rate of data transfer or preventing data transfer when a balance of the borrower account falls below a predetermined level.

* * * * *